United States Patent

Hart

[11] 3,887,226
[45] June 3, 1975

[54] TRAILER PULL-OUT UNIT

[76] Inventor: Ralph Stewart Hart, 1521 Lorne Park Rd., Mississauga, Ontario, Canada

[22] Filed: Mar. 2, 1973

[21] Appl. No.: 337,583

[52] U.S. Cl. ............................. 296/26; 296/23 H
[51] Int. Cl. ........................................... B60p 3/32
[58] Field of Search .... 296/23 R, 23 C, 23 F, 23 G, 296/23 H, 26

[56] References Cited
UNITED STATES PATENTS

| | | | |
|---|---|---|---|
| 2,154,810 | 4/1939 | Goeddertz | 296/23 R |
| 2,384,659 | 9/1945 | Wait | 296/26 |
| 2,519,517 | 8/1950 | Van Tassel | 296/23 C |
| 2,561,921 | 7/1951 | Guillot | 296/23 C |
| 2,772,915 | 12/1956 | Renno | 296/146 X |
| 2,813,747 | 11/1957 | Rice | 296/23 C |

*Primary Examiner*—Robert J. Spar
*Assistant Examiner*—L. J. Paperner
*Attorney, Agent, or Firm*—C. C. Kent; K. M. Hill

[57] ABSTRACT

A trailer with a pull-out unit to provide additional space; the unit is hinged and has seals which provide for weather-proofing in both the open and closed positions.

2 Claims, 3 Drawing Figures

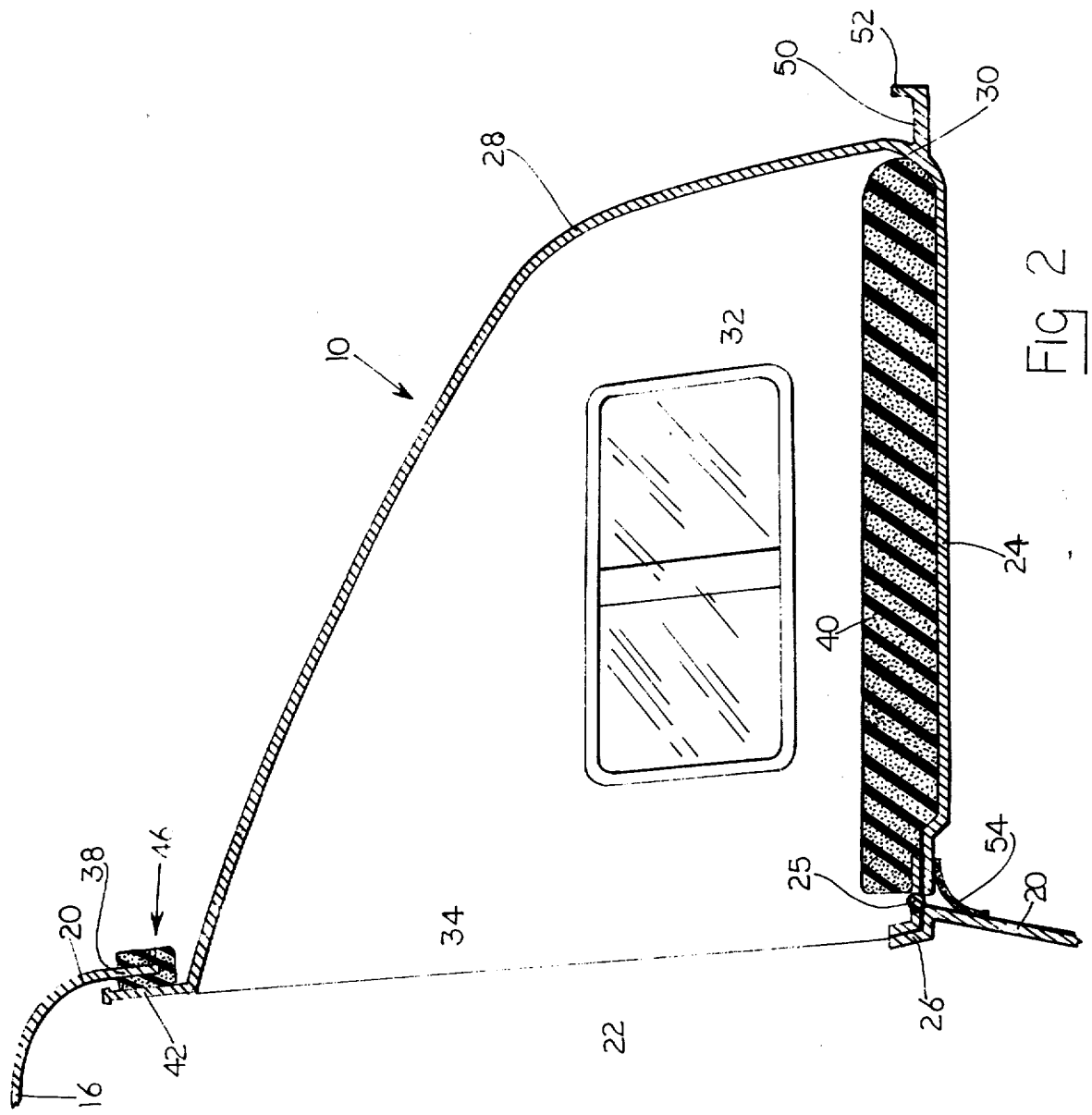

TRAILER PULL-OUT UNIT

FIELD OF THE INVENTION

This invention relates to a pull-out unit which is adapted to enlarge the usable area of a housing structure which is more particularly, but not necessarily, mobile, such as a travel trailer, truck camper, land or water-houseboat.

PRIOR ART

In many countries regulatory restrictions exist which limit the size of mobile vehicles but apart from this and as a pratical aspect it is desirable to limit the size of a mobile unit to facilitate manoeuverability.

A number of proposals have been made to increase the usable area of a mobile structure after it has come to rest; regulations generally prohibit occupation of a travel trailer when it is moving and any form of extension is retracted when it is desired to change the location of the trailer. Most proposals involve folding arrangements which are somewhat complicated and a commonly experienced difficulty is that repeated extension and retraction eventually affects the seals adversely.

SUMMARY OF THE INVENTION

It is an object of the invention to provide a pull-out unit for a mobile structure which unit gives increased usable area with rigidity, being easily positioned in the surrounding vehicle to provide an additional water-tight compartment.

The pull-out unit of the invention is essentially a rigid, non-folding structure which can be fabricated in plastic, reinforced plastic, metal or a combination thereof and assembled from one or more pieces, the unit being adapted for location upon one or both ends and/or sides of the housing structure.

The unit rotates into and out of an opening in the mobile structure by means of a hinge located along the lower edge of the opening.

It is a feature of the invention that the opening is provided with inner and outer seals. The unit is adapted to provide a stop cooperating with the inner seal to position the unit in a predetermined manner when it has been rotated out of the mobile structure. The unit is also provided with a flanged plate which compressibly closes around the outer seal of the opening when the unit has been rotated inwards of the structure. The interaction of the flanged plate and outer seal ensures a water-tight compartment.

BRIEF DESCRIPTION OF THE DRAWINGS

The invention will now be described in relation to the accompanying drawings in which:

FIG. 2 is a cross-sectional view of the pod shown in FIG. 1 taken on line 2—2, in particular showing the stop and seal arrangement.

DESCRIPTION OF A PREFERRED EMBODIMENT

Figure 1:
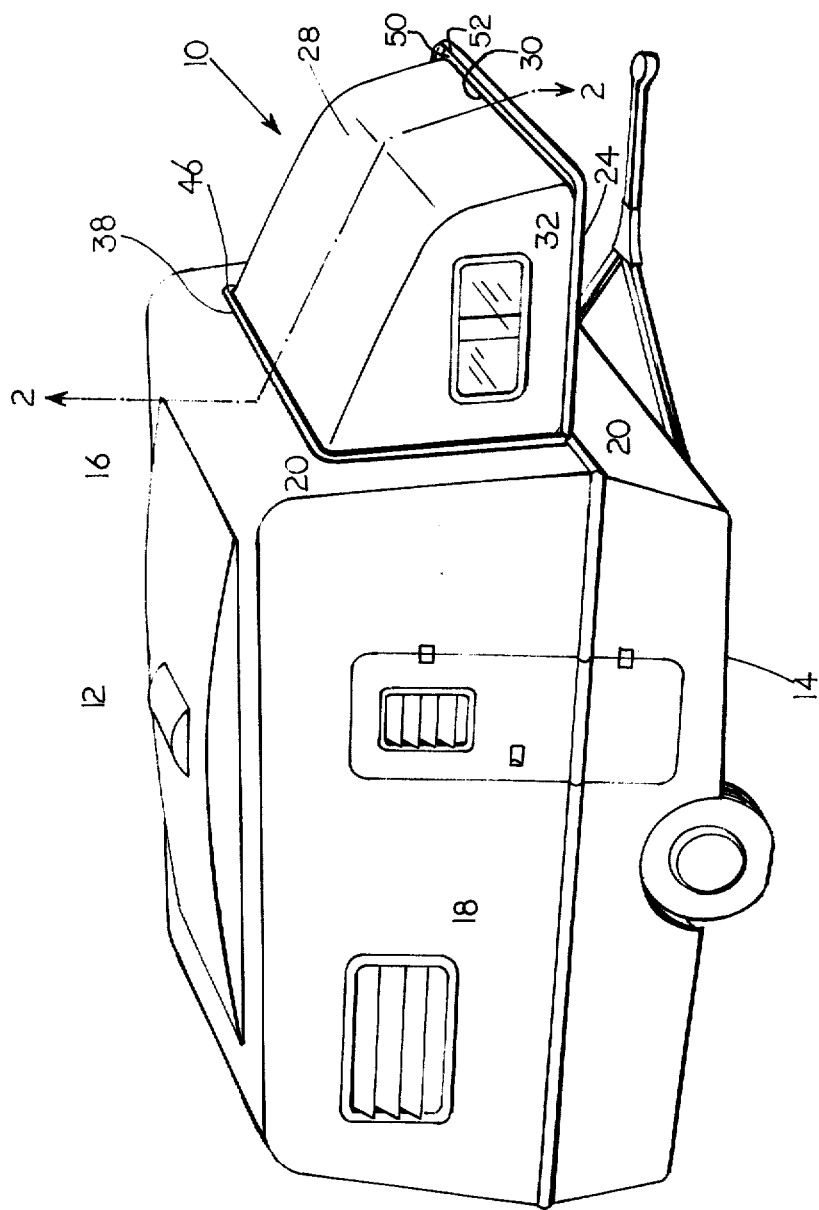
FIG. 1 is a perspective view showing a preferred embodiment of the pull-out unit or pod projecting from the end of a mobile trailer.

With reference to FIGS. 1 and 2 a pod generally denoted by the numeral 10 is shown as located in a mobile hicle generally denoted by the numeral 12 which is of conventional construction and comprises a bottom wall or floor 14, a top wall 16, side walls 18 and an end wall 20. The construction of the walls is conventional and they can be provided with windows or doors as desired.

In accordance with the invention and as shown more particularly in FIG. 2, the end wall 20 is provided with an opening 22 in which the pod 10 is located.

The pod 10 comprises a first panel 24 pivoted by a hinge 25 to the end wall 20 of the vehicle 12 along the lower edge 26 of the opening 22. The pod 10 also has a second cover panel 28 which joins the panel 24 along an edge 30 which is opposed to the edge 26. The pod 10 is completed by the opposed side panels 32 which connect the panel 24 to the cover panel 28, thus providing a substantially rigid structure with an internally disposed opening 34.

The panel 24 is provided with a suitable handle for manually pivoting the pod 10 outward of the trailer 12 until the panel 24 is substantially horizontal; the cover panel 28 is shaped to clear the top edge 38 of the opening 22 on rotation of the pod 10.

A mattress 40 may be provided in the pod 10 to give additional sleeping accommodation in which case the mattress 40 may be secured in a variety of ways to the inner surface of the panel 24. The edge of the arcuate panel 28 along the opening 34 of the extension 10 has an upstanding flange 42 which extends away from the opening 34 as shown more particularly in FIG. 2. Similarly each side panel 32 has a similar flange 42 which extends sideways in the same vertical plane as the flange 42 on the arcuate panel 28.

Figure 3:
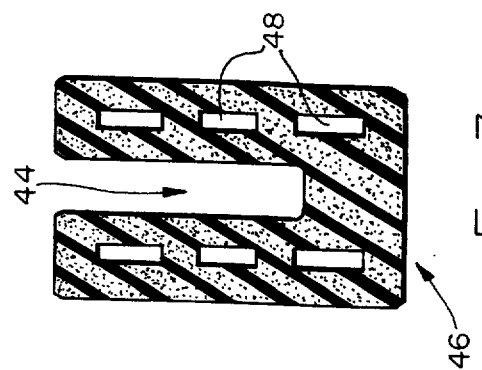
FIG. 3 is an enlarged sectional view of the type of seal shown in FIG. 2.

The remainder of the edges forming the opening 22, other than the edge 26 on which the pod 10 is pivoted is located in the channel 44 of a gasket generally denoted by the numeral 46, having a cross section more particularly illustrated in FIG. 3. The gasket 46 is preferably made of soft vinyl provided with internal air pockets 48 to assist compressibility for purposes explained below.

The gasket 46 lies in the plane of travel of the flange 42 when the pod 10 reaches the position in which the mattress 40 is horizontal; hence the gasket 46 and the flange 42 provide an internal stop seal to the pod 10 in the extended position.

The edge of the panel 24 other than when it is pivoted along edge 26 has an outwardly extending plate 50 provided with a flange 52. The width of the plate 50 is such that when the pod 10 is rotated for closure, the flange 50 will close over the gasket 46 in slight compression to provide a water-tight seal, the compressibility of the gasket 46 is assisted by the presence of the cavities 48.

A rubber flap 54 may be provided to seal the small gap between the floor 24 of the pod 10 and the end wall 20 of the vehicle 12.

What is claimed is:

1. A mobile structure having a wall provided with a rectangular opening defining a plurality of edges having at least one horizontal edge thereto; an extension to said structure comprising a floor panel extensible outwardly of said horizontal edge of said opening; a cover panel extensible outwardly of said opening from an edge thereon opposite said horizontal edge from which said floor panel extends; side panels connecting said floor and cover panels together to provide rigidity to said extension; said floor panel being pivotable on said horizontal edge of said opening allowing said extensionn to be rotatably moveable from a closed position within said structure to an open position externally of said structure; a seal secured to an edge of said opening opposite to said edge on which said floor panel is pivoted and including internally and externally projecting portions thereto; a flange projecting outwardly of the edge of said cover remaining within said structure, said flange bearing against said internally projecting portion of said seal when said extension is positioned externally of the said structure, said floor panel at its outer edge opposite that on which it is pivoted having a flanged plate projecting outwardly therefrom and generally parallel therewith; said externally projecting portion of said seal being receivable into and contained by said flanged plate when said extension is in said closed position within said structure.

2. A mobile structure according to claim 1 wherein said internally and externally projecting portions of said seal are composed of channel-shaped soft vinyl.